May 9, 1950     W. SCHIEL ET AL     2,507,383
ANIMAL TETHER
Filed June 12, 1946     2 Sheets-Sheet 1
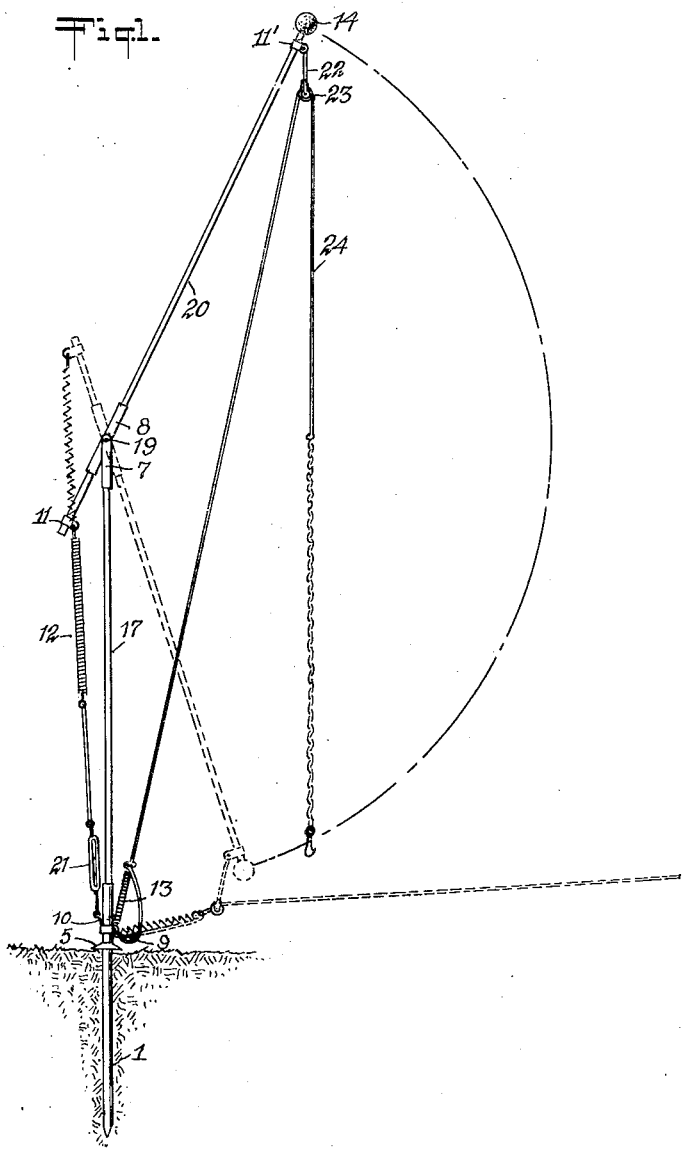
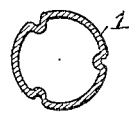
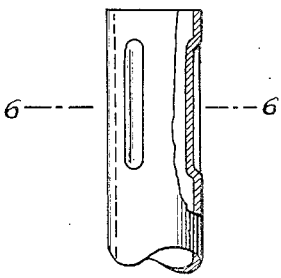
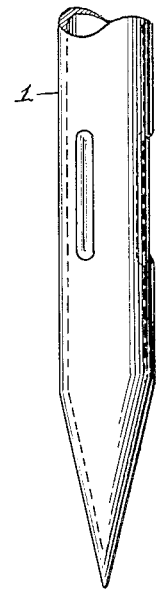
INVENTORS
William Schiel
and Norman Zacher
BY
Munn, Liddy & Glaccum
Attorneys May 9, 1950     W. SCHIEL ET AL     2,507,383
ANIMAL TETHER
Filed June 12, 1946     2 Sheets-Sheet 2
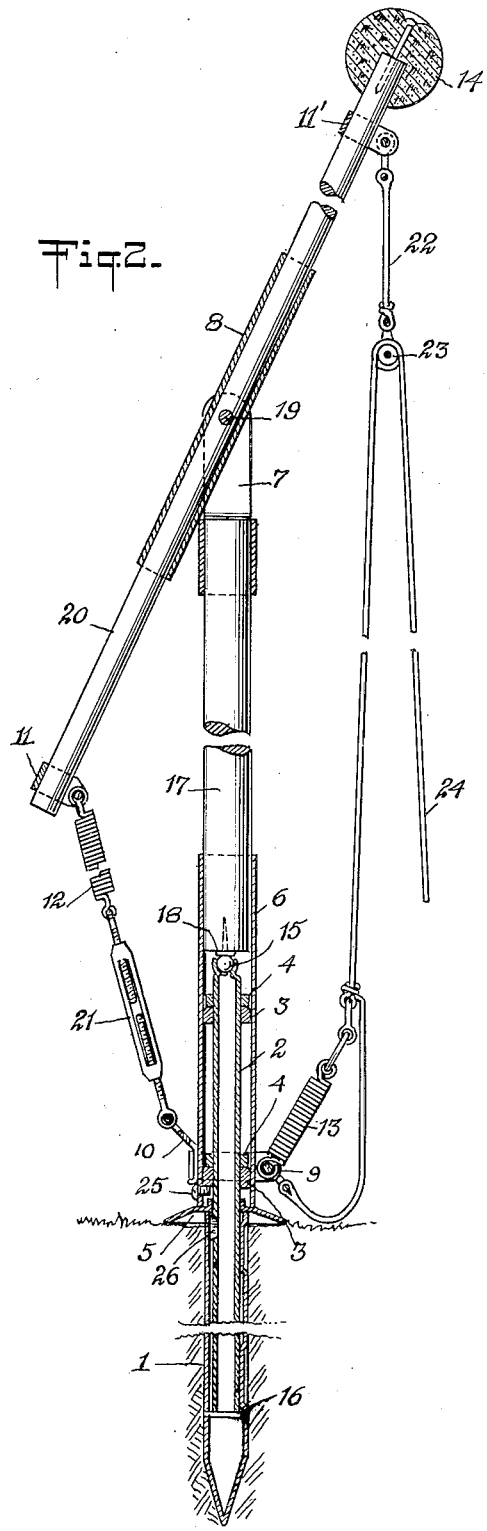
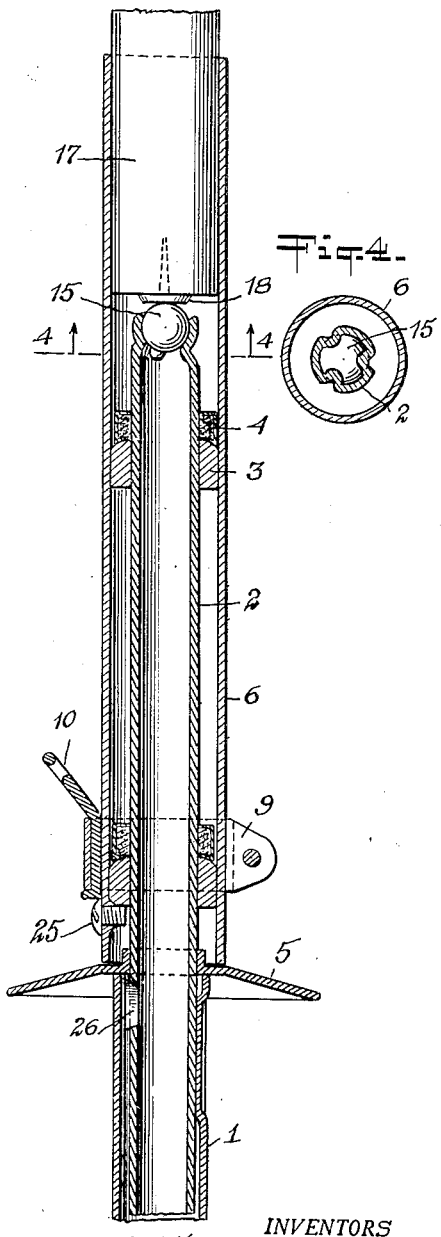
INVENTORS
*William Schiel*
*and Norman Zacher*
BY
*Munn, Liddy & Gelaccum*
Attorneys Patented May 9, 1950

2,507,383

UNITED STATES PATENT OFFICE 2,507,383

ANIMAL TETHER

William Schiel, Irvington, and Norman Zacher, Livingston, N. J.

Application June 12, 1946, Serial No. 676,291

2 Claims. (Cl. 119—117)

This invention relates to animal tethers and more particularly to a device that may be used to restrict the animal to a definite area and at the same time allow him freedom of movement.

An object of this device is to perfect a tether that can be easily installed at any position on a lawn with the minimum of effort.

It is also the objective to design this article in such a manner that it may be readily removed so that if desired it can be placed in another position.

Another object of this invention is to perfect a device whereby the animal will have complete freedom of movement in all directions.

An additional feature is that through a system of tension devices the animal is prevented from injuring himself in the event he takes a full run of the lead.

Another advantage is that the tether is so designed it is impossible for the animal to become entangled in his lead regardless of his position.

These are some of the advantages and objectives of our invention and others will be disclosed as the operation and function of the tether are described.

With reference to the drawings,

Fig. 1 reflects a perspective view of the tether showing the approximate position of the various working parts in the slack and full lead positions.

Fig. 2 reflects a side elevation view of the tether showing the detailed construction and relation of parts to each other.

Fig. 3 reflects an enlarged fragmentary side elevation view of the stake and insert stake.

Fig. 4 reflects a cross section view of the top of the insert stake on line 4—4 of Fig. 3.

Fig. 5 reflects an enlarged fragmentary side elevation view of the stake showing the location of the extrusions.

Fig. 6 reflects a cross section view of the stake on line 6—6 of Fig. 5.

Referring more particularly to the drawings, Fig. 1 shows a perspective view of the tether indicating the various relative positions of the operating parts when the device is in the slack and full lead positions. Fig. 2 shows a hollow steel stake, one which is pointed and driven into the ground until its top is slightly above the surface. Stake 1 as shown in Fig. 5 has two sets of extrusions which protrude on the inner side of the stake and which are located intermediate between the open and pointed end of the stake. Each set of extrusions consists of three projections and their purpose is to insure a tight fitting and at the same time facilitate the removing of the insert stake. The shield 5 which is a circular piece of metal elevated in the center and with beveled edges has a hole in the center to receive the insert stake. The under part of the shield contacts the top portion of the stake 1 with the beveled edges of the shield 5 being flat on the ground. The stake assembly consists of several parts, namely, the insert stake 2, the bearing sleeve 6, bearing lugs 3, oil felt retaining rings 4 and ball bearing 15, mounted in top of insert stake 2. The lower portion of the insert stake 2 fits into the stake 1 with the base of the insert stake resting on platform 16. Mounted in the top of the insert stake 2 is a ball bearing 15. The metal bearing sleeve 6 which is open at both ends fits around the insert stake 2 and rests on the top of the shield 5 in such a manner that the sleeve is free to rotate. Between the sleeve 6 and the insert stake 2 are mounted two bearing lugs 3 with oil felt retaining rings 4 which enables the sleeve 6 to rotate around the insert stake with a minimum of friction. Fitting into the top of the sleeve 6 and resting on the ball bearing 15 of the insert stake is a wooden shaft 17. In one end of this shaft is a flat headed metal pin 18 which rests on the ball bearing 15.

Mounted on the other end of shaft 17 is a metal yoke 7 consisting of a cup-shaped end that fits over the shaft 17 and two divergent arms are anchored to a hollow metal pivot center 8 by a pin. Through the metal pivot center 8 runs a wooden rod 20. Mounted on one end of rod 20 is a sponge rubber ball 14 and set in a short distance from each end of rod 20 are metal clamps 11 and 11' with provision for attachments to be made to the clamps. Around the bearing sleeve 6 is a metal clamp 9 which is mounted a short distance above the shield 5 and provides for attachments to be made to the end thereof. Held in place between the clamp No. 9 and the bearing sleeve 6 is an annular metal plate 10 with provision for attachment to be made to the end thereof. Attached to the clamp 11 at the short end of shaft 20 is an adjustment spring 12 which is fastened at its other end to a turn buckle 21 being attached to the annular metal plate 10 that is held by clamp 9. This assembly consisting of the spring and turn buckle can be used for the purpose of adjusting the amount of tension so that the slack in the lead 24 will be taken up when the animal is in close proximity to the support stake. Attached to the clamp 11' positioned at the opposite end of the rod 20 is a link assembly 22 terminating in a pulley arrangement 23. Attached to one side of clamp 9 is a shock spring 13 which through the linkage arrangement is attached to one end of the lead 24. The lead is then directed through the pulley 23 and at its end is a conventional device for adjustment to the animal's collar or harness.

In the event the animal uses the full extent of his lead, the strain on the lead will be absorbed through the shock spring 13. As the animal moves in the direction of the support stake the slack in the lead will be taken up by the spring 12 so that there is no possibility of the animal becoming entangled in his lead. As the entire shaft is free to rotate it can be seen that the animal will have unrestricted movement in all directions. The sponge rubber ball 14 mounted on one end of the rod 20 is a protective device in the event that any sudden movement of the animal would cause the rod 20 to come in contact with any person or the animal.

As shown in Fig. 3 positioned between the insert shaft 2 and stake 1 is a key 26 which prevents rotation of the insert shaft in stake 1. Located near the base of the bearing sleeve 6 is a set screw 25 which in conjunction with key 26 makes it possible to remove the entire unit out of stake 1 in the event it is desired to place the unit at another location where a duplicate stake 1 has been installed.

We claim:

1. An animal tether device comprising a rigid support consisting of a hollow stake, a shield positioned around the top of said stake, an inner stake fitted in the hollow stake, a bearing sleeve with bearing means mounted therein positioned to rotate around said inner stake, a rotatable shaft, one end of said shaft contacting the top of said inner stake, the opposite end of said shaft connected by pivotal means to a rod, resilient means having one end connected with one end of said rod and its opposite end connected with said support, a pulley on other end of said rod, a flexible tether bent around said pulley with one end secured to said support and its opposite end free and resilient means having its opposite ends connected with the support and tether respectively.

2. An animal tether device comprising a rigid support consisting of a hollow stake, an inner stake set into said hollow stake, a bearing sleeve with bearing means mounted therein positioned to rotate around said inner stake, a ball-bearing on said inner stake, a rotatable shaft, one end contacting said ball-bearing on the top of the inner stake, the opposite end of said rotatable shaft being connected by pivotal means to a rod, a spring having one end attached to said rod and the other end connected to an adjustable turn-buckle, said turn-buckle being fastened to said support by means of a rotatable bearing sleeve, a pulley on the other end of said rod and a flexible tether belt around said pulley with one end secured to said support and the opposite end free.

WILLIAM SCHIEL.
NORMAN ZACHER.

REFERENCES CITED

The following references are of record in the file of this patent:

UNITED STATES PATENTS

| Number | Name | Date |
| --- | --- | --- |
| 61,435 | Kidder | Jan. 22, 1867 |
| 157,530 | McAffee | Dec. 8, 1874 |
| 215,730 | Fox et al. | May 27, 1879 |
| 218,452 | Ricker | Aug. 12, 1879 |
| 221,651 | Wright | Nov. 11, 1879 |
| 350,277 | Taylor | Oct. 5, 1886 |
| 387,423 | King | Aug. 7, 1888 |
| 500,836 | Albach | July 4, 1893 |
| 790,910 | McClintock | May 30, 1905 |
| 942,229 | Wing | Dec. 7, 1909 |
| 1,494,161 | Fairbanks | June 6, 1922 |
| 1,502,342 | Lucas | July 22, 1924 |
| 2,295,581 | Hyde | Sept. 15, 1942 |